United States Patent [19]

Ariki et al.

[11] Patent Number: 5,113,492
[45] Date of Patent: May 12, 1992

[54] APPARATUS FOR PROCESSING CHARACTER AND IMAGE DATA

[75] Inventors: Yumi Ariki, Kagoshima; Katsuhito Takezawa, Kawasaki, both of Japan

[73] Assignee: Canon Kabushiki Kaisha, Tokyo, Japan

[21] Appl. No.: 243,791

[22] Filed: Sep. 13, 1988

[30] Foreign Application Priority Data

Sep. 16, 1987 [JP] Japan .................................. 62-229827
Oct. 19, 1987 [JP] Japan .................................. 62-264631

[51] Int. Cl.⁵ .......................................... G06F 15/63
[52] U.S. Cl. .................................................. 395/147
[58] Field of Search ....................... 364/518, 521, 523; 340/723, 750, 793, 798, 732; 358/75, 443, 470, 452, 183, 404, 433, 442, 444, 462; 382/44, 48, 56, 47

[56] References Cited

U.S. PATENT DOCUMENTS

| | | | |
|---|---|---|---|
| 4,214,276 | 7/1980 | Pugsley et al. | 358/256 |
| 4,682,190 | 7/1987 | Ikeda | 346/154 |
| 4,750,212 | 6/1988 | Yokomizo | 358/183 X |
| 4,809,083 | 2/1989 | Nagano et al. | 382/47 X |
| 4,809,345 | 2/1989 | Tabata et al. | 382/47 |
| 4,819,063 | 4/1989 | Sugiura et al. | 358/75 |
| 4,827,349 | 5/1989 | Ogata et al. | 358/256 |
| 4,922,349 | 5/1990 | Abe et al. | 358/443 |

FOREIGN PATENT DOCUMENTS

| | | |
|---|---|---|
| 0029327 | 5/1981 | European Pat. Off. . |
| 2729113 | 1/1978 | Fed. Rep. of Germany . |
| 3135963 | 4/1982 | Fed. Rep. of Germany . |
| 3324384 | 1/1984 | Fed. Rep. of Germany . |
| 3420482 | 12/1984 | Fed. Rep. of Germany . |
| 3438081 | 5/1985 | Fed. Rep. of Germany . |
| 3503256 | 8/1985 | Fed. Rep. of Germany . |

OTHER PUBLICATIONS

Funkschau Elektronik No. 249, pp. 46–47, Oct. 1987.

Primary Examiner—Heather R. Herndon
Attorney, Agent, or Firm—Fitzpatrick, Cella, Harper & Scinto

[57] ABSTRACT

A mixed data processing apparatus having a memory for storing mixed data of character blocks and image blocks and a discriminator of discriminating whether or not the number of blocks stored in the memory exceed a predetermined number. A synthesizer synthesizes the blocks when the number of blocks in memory exceeds the predetermined number of blocks. During synthesizing, character blocks are converted into image blocks. After synthesizing, the mixed data is transmitted by a transmitter to a party being transmitted to.

56 Claims, 10 Drawing Sheets

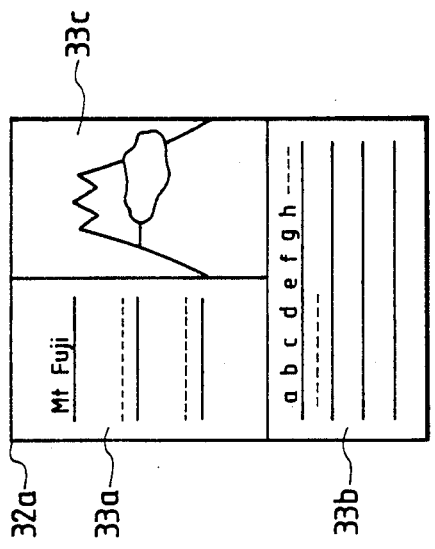

FIG. 7

| a: PAGE SIZE |
| --- |
| b: BLOCK POSITION |
| c: BLOCK SIZE |
| d: IDENTIFIER HAVING CHARACTER ATTRIBUTE |
| e: CHARACTER SHIFT DIRECTION |
| f: CHARACTER INTERSPACE |
| g: LINE INTERSPACE |
| h: INITIAL OFFSET |

DOCUMENT/PAGE DEFAULT VALUE

FIG. 8A

| b: BLOCK POSITION |
| --- |
| c: BLOCK SIZE |
| d: IDENTIFIER HAVING CHARACTER ATTRIBUTE |
| e: CHARACTER SHIFT DIRECTION |
| f: CHARACTER INTERSPACE |
| g: LINE INTERSPACE |
| h: INITIAL OFFSET |

CHARACTER BLOCK ATTRIBUTE

FIG. 8B

| b: BLOCK POSITION |
| --- |
| c: BLOCK SIZE |
| i: IDENTIFIER HAVING IMAGE INFORMATION |
| j: KIND OF ENCODING |
| k: PIXEL TRANSMISSION DENSITY |

IMAGE BLOCK ATTRIBUTE

FIG. 8C

APPARATUS FOR PROCESSING CHARACTER AND IMAGE DATA

BACKGROUND OF THE INVENTION

1. Field of the Invention

The present invention relates to a mixed data processing apparatus for processing mixed data having a character block consisting of character codes and an image block consisting of image data.

2. Related Background Art

Hitherto, in a mixed data processing apparatus for dividing one page into a plurality of character blocks and image blocks and for processing them, if the number of blocks to be divided is large, the editing and reproducing processes become complicated. Therefore, in such a kind of mixed data processing apparatus, there is a limitation of the number of processable blocks in dependence on the processing capability of every apparatus. On the other hand, even if the number of blocks is within the processing capability, there is a drawback such that when the number of blocks increases, the processing time becomes long in time corresponding to the increased number of blocks.

Further, when performing the communication between the mixed data processing apparatuses, if the number of processable blocks of the apparatus on the reception side is smaller than that of the apparatus on the transmission side, the transmission cannot be performed in the case where the number of blocks exceeds the number of processable blocks of the apparatus on the reception side. In other words, even in the case of the mixed data processed on the transmission side, there is a case where it cannot be transmitted due to the processing capability on the reception side. On the other hand, even when data can be transmitted, there is a problem such that when the number of blocks increases, the transmitting time becomes long.

On the other hand, in the conventional mixed data processing apparatus, in order to store the mixed data of one page, the size of page, identification codes of the character block and image block in each of the blocks constituting the page, and position and size of each block are stored as attribute information. To unify the sizes of documents consisting of a plurality of pages, or in the case of transmitting the edited mixed data, in order to match with the capability of the apparatus on the reception side such as a size of recording paper or the like on the reception side, the page size of the mixed data needs to be changed. However, for instance, in the case of reducing and changing from the page of a large size to the page of a small size as in the case of changing the page made at the A4 size to the page of B5 size, it is insufficient that only the page size registered as the attribute information is merely changed. This is because there occurs such a situation that the block constituting the mixed data made at the A4 size exceeds the page of the B5 size.

As mentioned above, hitherto, a document consisting of mixed data cannot be variably magnified.

As prior arts regarding the present patent application, there has been known U.S. patent application Ser. No. 855,704,—Filing date: Apr. 25, 1986, now U.S. Pat. No. 4,827,349 which issued on May 2, 1989. Image data and character code data mixed on one page of a document are each divided into block areas and transmitted in block units. On the receiving side, the block data received are assembled to reproduce on a page of the document, which is then printed out. If the receiving side is a facsimile device, all data are converted into image data. If the receiving side is capable of processing only character codes, only the character codes are transmitted. In other words, data are transmitted to conform to the capability of the receiving side. There has also been known U.S. patent application Ser. No. 911,779, —Filing date: Sept. 26, 1986, pending. When image data and character code data are mixed on one page of a document, processing is executed automatically to divide these data into individual block areas on the transmitting side. The image areas and character code areas are recognized and are divided into blocks in such a manner that the minimum number of blocks are obtained.

SUMMARY OF THE INVENTION

The present invention is made in consideration of the foregoing points and it is an object of the invention to provide a mixed data processing apparatus which can convert mixed data into forms which can be easily processed.

Another object of the invention is to provide a mixed data processing apparatus in which a data format is converted in accordance with the processing capability of each apparatus.

Still another object of the invention is to provide a mixed data processing apparatus which can process data at a high speed.

Still another object of the invention is to provide a mixed data processing apparatus which can reduce the number of blocks constituting mixed data.

Still another object of the invention is to provide a mixed data processing apparatus which can variably magnify mixed data.

Further another object of the invention is that a format of transmitting data is changed in accordance with the processing capability of the party to be transmitted to and the resultant data is then transmitted.

Further, another object of the invention is to unify the page sizes of a document consisting of a plurality of pages.

The above and other objects and features of the present invention will become apparent from the following detailed description and the appended claims with reference to the accompanying drawings.

BRIEF DESCRIPTION OF THE DRAWINGS

FIG. 7 is a diagram for explaining the corresponding relation of each block in one page shown in FIG. 6;

FIGS. 8A, 8B and 8C are diagrams for explaining data structures of page default value lists;

DETAILED DESCRIPTION OF THE PREFERRED EMBODIMENTS

The first embodiment of the present invention will be described in detail hereinbelow with reference to the drawings.

Figure 1:
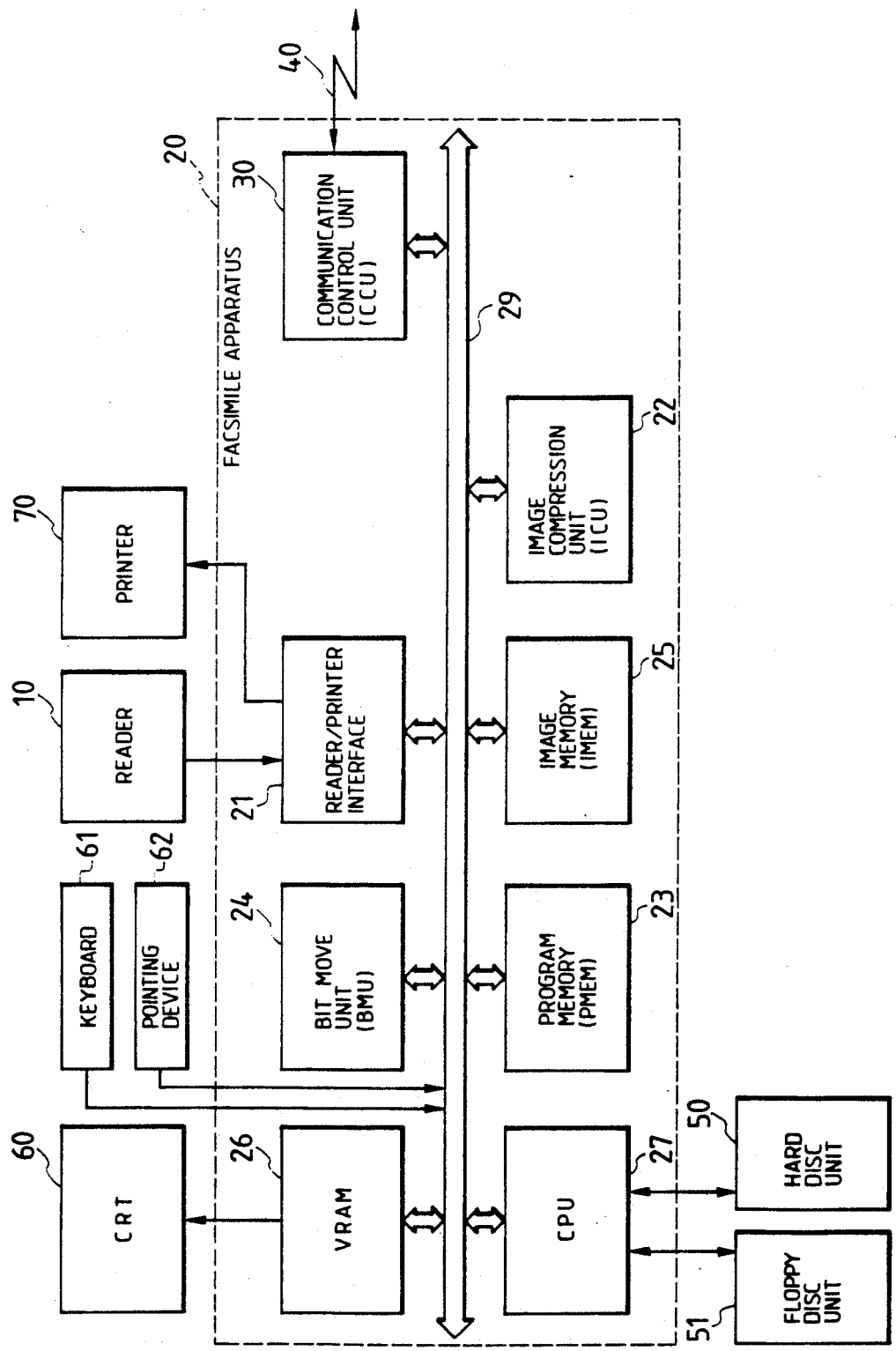
FIG. 1 is a block diagram showing an arrangement of the first embodiment of the present invention.
Figure 2:
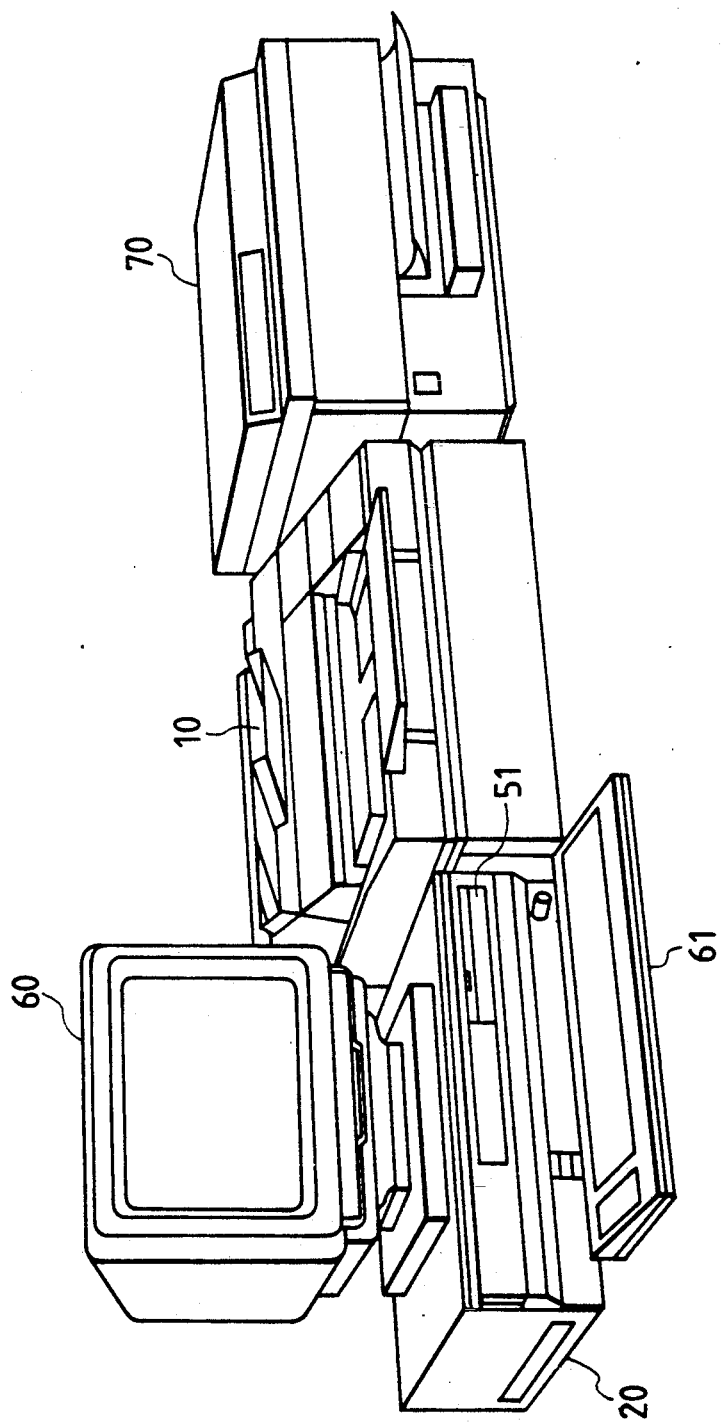
FIG. 2 is a perspective view showing the first embodiment.

FIG. 1 is a block diagram showing an arrangement of the first embodiment. FIG. 2 is a perspective view showing the first embodiment.

A reader 10 reads a predetermined original and outputs an electric signal.

A facsimile apparatus 20 comprises: a reader/ printer interface 21; an image compression unit (hereinafter, referred to as an ICU) 22; a program memory (hereinafter, referred to as a PMEM) 23; a bit move unit (hereinafter, referred to as a BMU) 24; an image memory (hereinafter, referred to as an IMEM) 25; a video RAM (hereinafter, referred to as a VRAM) 26; a central processing unit (hereinafter, referred to as a CPU) 27; a bus 29; and a communication control unit (hereinafter, referred to as a CCU) 30.

The ICU 22 compresses or expands data and uses the two-dimensional compression to raise the encoding ratio. The program memory 23 has a memory area for an operating system (OS) program to control input and output apparatuses provided around the facsimile apparatus 20 and each unit provided in the facsimile apparatus; a memory area for an application program; a memory area to set information which has been transmitted to, reserved, or registered (the party to be transmitted, transmission start time, document to be transmitted, and the like); and a font memory area to convert character codes into an image. In addition, the PMEM 23 includes a memory management unit (MMEM) and also has a work area as a buffer for transmission data to transmit data from a hard disc unit 50 through the CCU 30 or to store data from the CCU 30 into the hard disc unit 50. On the other hand, code data of a document which is input from a keyboard 61 is also stored into the PMEM 23. The BMU 24 is used to edit an image on a CRT 60 so as to perform the enlargement, reduction, rotation, movement, cutting, or the like to a predetermined image. The IMEM 25 has a memory capacity of 8 Mbytes and stores image data from the reader; image data edited by the BMU 24; image data magnified by the ICU 22; character code data input from the keyboard 61; image data obtained by converting mixed data or character codes into an image; and the like. In the case of the mixed data, identifiers are added to both of the image block and character block and the resultant data is stored into the BMU 24. The VRAM 26 stores the image data to be displayed to the CRT 60 in bit map codes.

On the other hand, the hard disc unit 50 and a floppy disc unit 51 are provided as external memory units. Although these units are non-volatile memories, a battery back-up memory can also be used as a non-volatile memory.

The keyboard 61 is used to input characters or the like and to further designate a position on the CRT 60 by using a cursor.

A printer 70 is connected to the facsimile apparatus 20 and is used to output a document which is made by synthesizing both the character codes input by the keyboard 61 and the image data read by the reader 10 or a document transmitted through the CCU 30 or the like.

In the facsimile apparatus of the embodiment with the foregoing structure, in the case of transmitting the mixed data in which a document of one page consists of a plurality of character blocks and image blocks, the character blocks are transmitted as character codes and the image blocks are transmitted as the bit image data (the encoded image data). The reason why the character blocks are transmitted as the character codes is because information can be more efficiently transmitted by character codes rather than by bit image data. Similarly, in the case of storing data, it is desirable to store characters by using codes because it is sufficient to use a small memory capacity. In addition, even in the case of performing an editing process, it can be executed at a high speed. However, if the number of blocks in one page increases, the processes become complicated. Therefore, the operation which will be explained hereinafter is executed in the embodiment.

Figure 3:
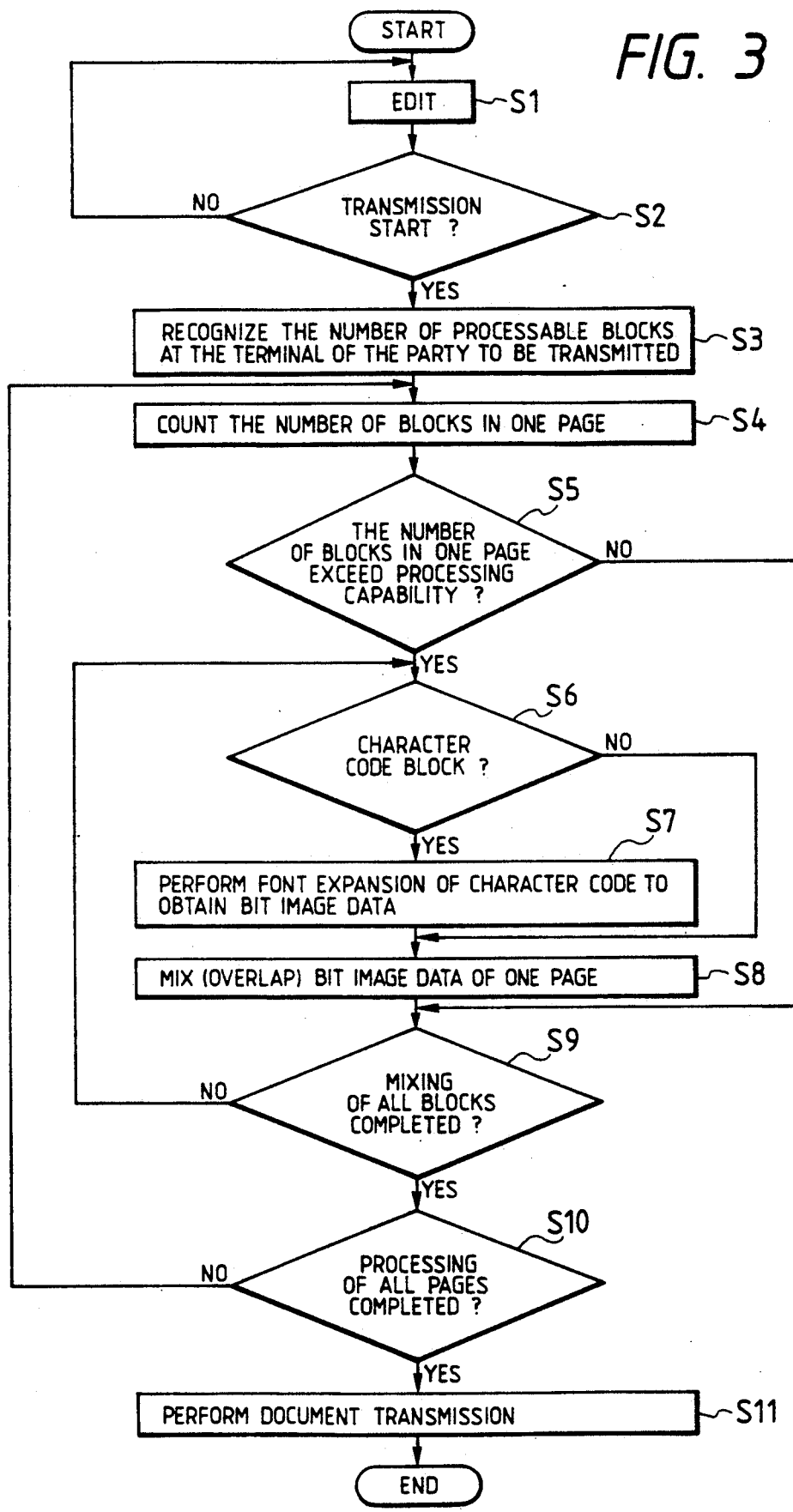
FIG. 3 is a flowchart for explaining the operation of the first embodiment.

FIG. 3 is a flowchart showing the transmitting operation in the embodiment. The following operations in the flowchart are executed by the CPU 27 on the basis of the program stored in the PMEM 23.

A document made by the bit image data from the reader 10 and the code data from the keyboard 61 exists on the CRT 60, or a document which has already been edited exists in the hard disc unit 50 (step S1).

This mixed data is stored in the PMEM 23 or IMEM 25. The CPU 27 starts a communicating procedure to a party to be transmitted to when it detects an indication of the start of the transmission of a document of the mixed data stored in the PMEM 23 or IMEM 25 or a document of the mixed data stored in the hard disc unit 50 (step S2). In this embodiment, the CPU 27 starts the communicating procedure when it detects that an operator has depressed a transmission button on the keyboard 61 or a transmission preserved time which had previously been registered in the PMEM 23 has come. The CPU 27 receives the maximum number of processable blocks (about 32 blocks in general) for the terminal of the party to be transmitted to with respect to the number of blocks in one page on basis of the data received from the party to be transmitted to in accordance with the communicating procedure (step S3).

Next, the CPU 27 counts the number of blocks constituting the first page of a document to be transmitted (step S4). If the number of blocks has already been registered in a file indicative of the attribution of a document to be transmitted, the number of blocks is recognized by referring to the number of blocks registered in this file. The CPU 27 compares the number of blocks of the first page of the document to be transmitted to with the maximum number of processable blocks for the terminal of the party to be transmitted. A check is made (step S5) to see if the data of one page in this document is constructed by the number of blocks (ordinarily, about 32 blocks; the number of blocks more than the number of processable blocks at the terminal on the reception side which were received by the communicating procedure) exceeding the fundamental transmitting function or not. With respect to the page in which the number of blocks of one page exceeds the processing capability, a check is made to see if the block is a character code block or not (step S6). If it is the character code block, the font expansion of the character code is performed by using the font stored in the PMEM 23, thereby converting into the bit image data (step S7). Then, the CPU 27 mixes the blocks, i.e., overlaps the bit image data of one page (step S8). In this manner, all of the block data in one page are converted into images and the data of each block are mixed (step S9). The processes in steps S2 to S6 are executed with respect to the data of all pages. If it is decided that the processes of all pages have been completed (step S10), the processing routine advances to the transmitting operation (step S11).

As described above, according to the embodiment, for the page consisting of a number of blocks which is larger than the number of processable blocks at the terminal of the party to be transmitted to, the image data of this page is converted so that it is constructed by one image block and, thereafter, the resultant image data can be transmitted. On the other hand, for the page consisting of the number of blocks which is equal to or smaller than the number of processable blocks for the terminal of the party to be transmitted to, the character block can be transmitted as character code data or the image block can be transmitted as the bit image data. Therefore, in this embodiment, the format of the data to be transmitted is converted in accordance with the processing capability at the terminal of the party to be transmitted to and, thereafter, the resultant data can be transmitted. Consequently, the data transmission can be performed irrespective of the number of processable blocks at the terminal of the party to be transmitted to.

In this embodiment, every time the character code has been font expanded, the CPU 27 has mixed the bit images of this page. However, after all of the character blocks of the page have been font expanded, they can also be mixed. With this method, the mixing processes can be executed in a lump, so that the processing speed can be raised. However, many memories are needed since it is necessary to store the bit image block obtained by font expanding the character code block.

Figure 4:
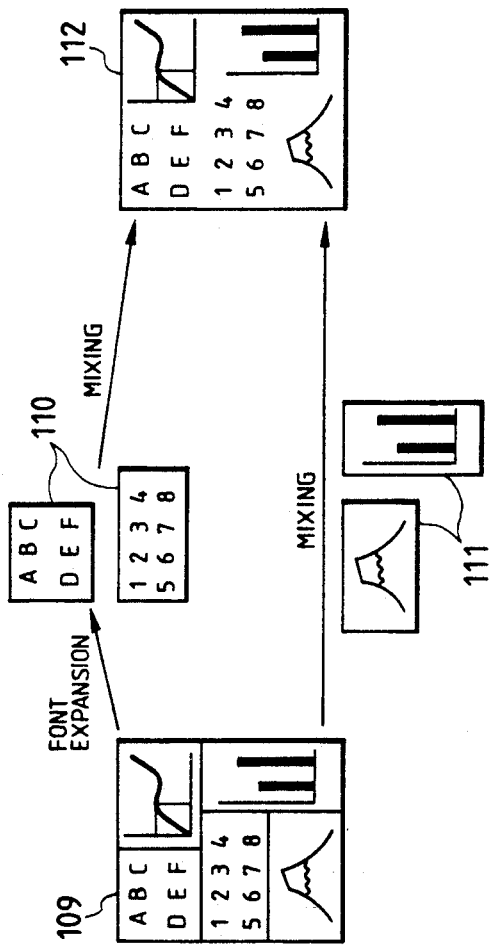
FIGS. 4 and 5 are format diagrams showing the conversion and transition of document data in the first embodiment.

The operation of the embodiment will now be further explained on the basis of a conversion format diagram of document data of the embodiment shown in FIG. 4.

Reference numeral 109 denotes a mixed data of one page which was made by document making and editing processes. The mixed data 109 consists of a plurality of character code blocks and a plurality of bit image blocks. Reference numeral 110 denotes character code blocks of the data of one page. After the character code blocks 110 are font expanded (step S7 in FIG. 3), they are mixed (step S8) and become data 112 of one block of one page. Bit image blocks 111 of the data of one page are directly mixed (step S8) and become the data 112 of one block of one page.

Figure 5:
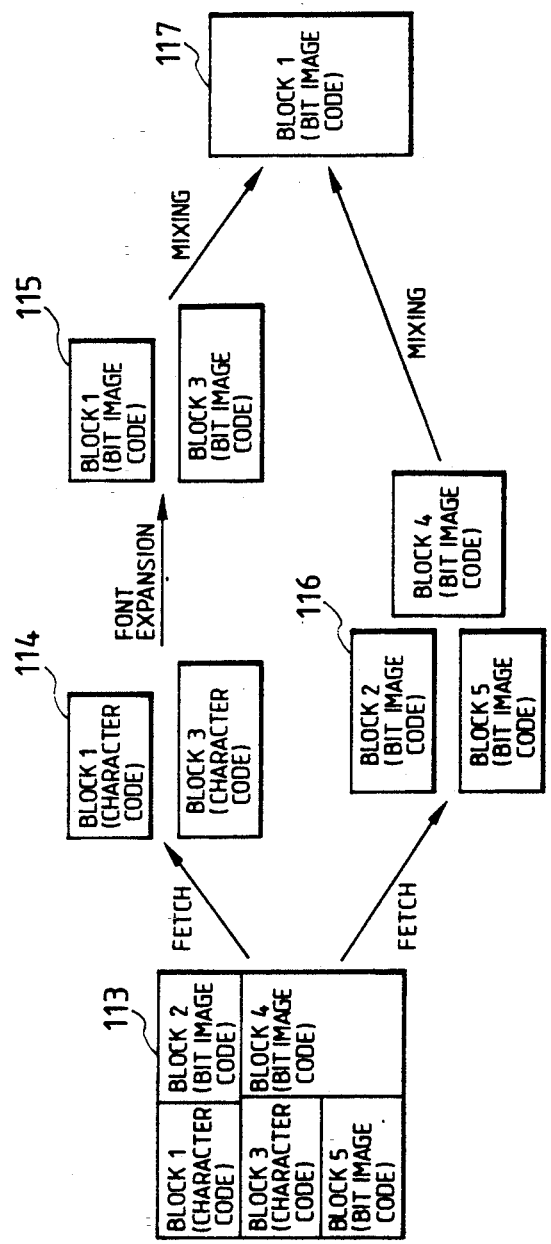

FIG. 5 is a diagram for explaining the conversion format diagram of FIG. 4 with respect to the block information. Reference numeral 113 denotes mixed data of one page which was made by the document making and editing processes; 114 indicates a character code block extracted from the data of one page; 115 a bit image block obtained by font expanding the character code block 114; and 116 a bit image block extracted from the mixed data 113. A bit image block 117 of one block of one page is newly synthesized from the bit image block data 115 and 116.

In the mixing of the block data in step S8 mentioned above, there is a case where the block data and another block data are overlappingly mixed. Information indicating whether these blocks overlap or not is added as attribute information to each of the block data. This attribute information includes data representing whether the block data is overlaid or not. When the CPU 27 determines that the overlay information is included, the CPU 27 overlays image data block in addition to the preceding image data block when mixing data. If no overlay information is included in the attribute information, the CPU 27 erases the preceding data with regard to the portion where data is mixed and writes block data to be overlaid.

In the foregoing embodiment, when the data to be transmitted exceeds the number of processable blocks for the terminal of the party to be transmitted to, all data of one page are transmitted as image data. However, the number of blocks (e.g., 32) is preset and when the data to be transmitted exceeds this preset number, all data of one page can also be transmitted to as image data without being limiting to the party to be transmitted.

That is, when the number of blocks increases, the transmitting process becomes complicated, so that the processing time becomes long. Therefore, by converting, such that the number of blocks of one page is set to one, the process can be simplified.

On the other hand, as another embodiment, after completion of the conversion into the image blocks, the CPU 27 selects the adjacent image block and a character block constituting one block. This character block is selected and expanded and synthesized with the adjacent image block, thereby reducing the number of character blocks. By repeating these operations, the number of transmitting blocks can also be set to the number of processable blocks for the terminal of the party to be transmitted to.

The second embodiment of the invention will now be described in detail hereinbelow with reference to the drawings.

A block diagram and a perspective view which show an arrangement of the second embodiment are similar to the block diagram and perspective view of the first embodiment shown in FIGS. 1 and 2.

A structure of mixed data according to the second embodiment will be described.

Figure 6:
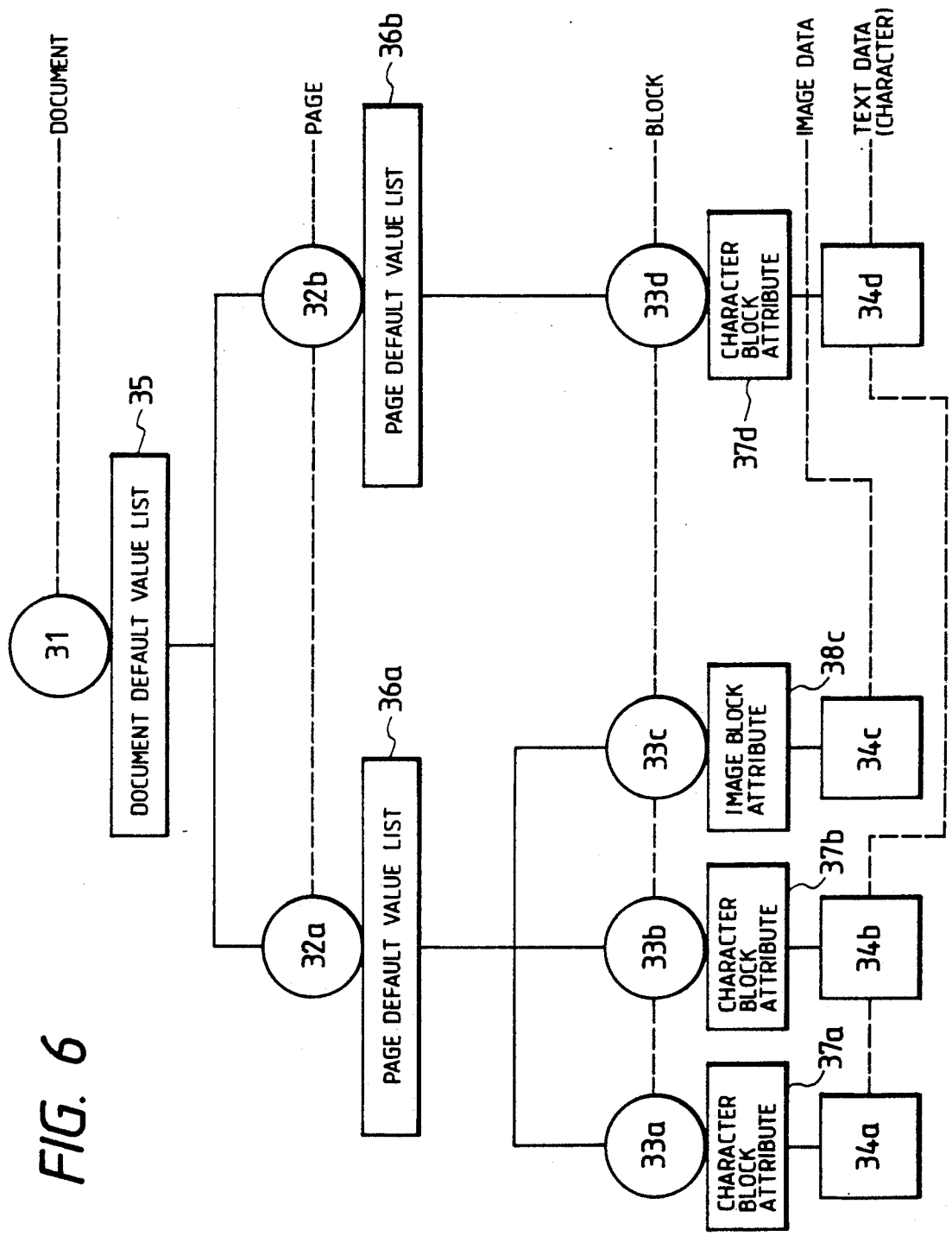
FIG. 6 is a diagram for explaining a structure of mixed data which is displayed on a CRT display shown in FIG. 1.

FIG. 6 is a diagram for explaining a structure of mixed data. A document 31 consists of pages 32a and 32b. The page 32a consists of blocks 33a, 33b, 33c, and the like (three blocks are used in this embodiment). The block 33a is associated with text data 34a; the block 33b is associated with text data 34b; and the block 33c is associated with image data 34c. The page 32b is associated with text data 34d as character data.

Reference numeral 35 denotes a document default value list and specifies a data structure of the document 31. A page default value 36a specifies a data structure of the page 32a. Reference numeral 36b also indicates a similar page default value. A character block attribute 37a specifies a data structure of the text data 34a. Reference numerals 37b and 37d also represent similar character block attributes. An image block attribute 38c specifies a data structure of the image data 34c. FIG. 7 is a diagram showing the corresponding relation among the blocks 33a, 33b, and 33c of the page 32a shown in FIG. 6. In the diagram, the page 32a is divided into three blocks. The number of blocks in one page is not limited to three The area of almost ⅔ of the information area of the page 32a is divided by the blocks 33a and 33c and the lower area of about ⅓ is constructed by the block 33b.

With reference to FIGS. 8A to 8C, an explanation will now be made with regard to data structures of the document default value list 35, page default value list 36, character block attribute 37a, and image block attribute 38c shown in FIG. 6.

FIG. 8A is a diagram showing a document/page default value list. This list comprises: a size a of page; a position b of block; a size c of block; an identifier d having the character attribute; a character shift direction e; a character interspace f; a line interspace g; an initial offset h; and the like.

FIG. 8B is a diagram showing a character block attribute. This attribute comprises: a block position b and a block size c as attribute information with respect to a character block; an identifier d having a character attribute; a character shift direction e; a character interspace f; a line interspace g; an initial offset h; and the like.

Further, FIG. 8C is a diagram showing an image block attribute. This attribute comprises: a block position b and a block size c regarding an image block; an identifier i having image information; a kind of encoding j; a pixel transmission density k; and the like.

Figure 9:
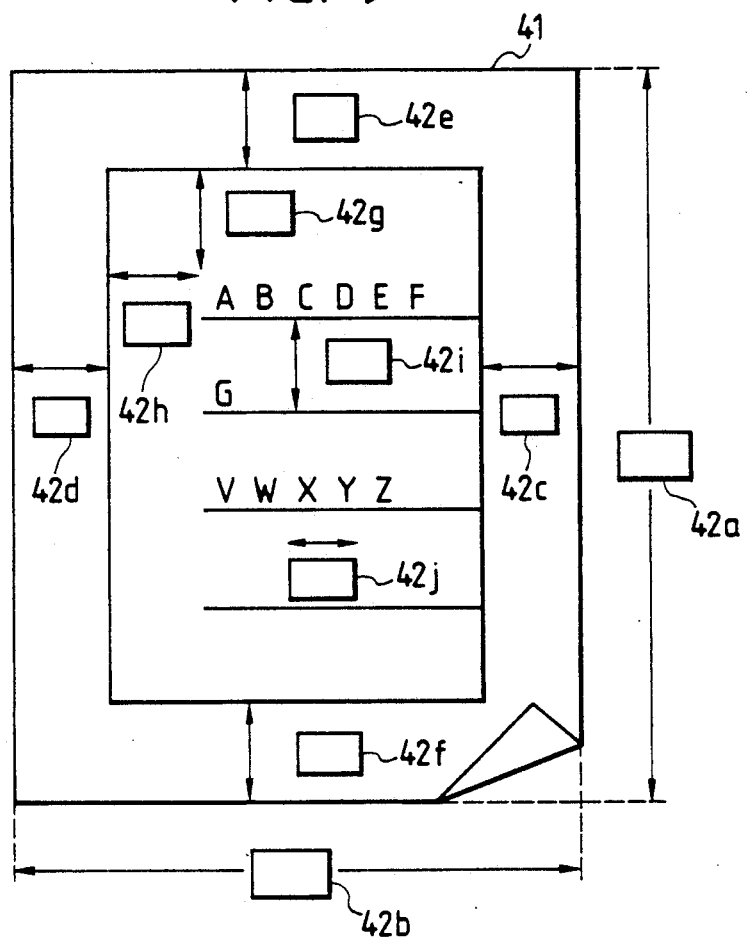
FIG. 9 is a diagram showing a display state of an attribute information image of a page default value list.

FIG. 9 is a diagram showing an image display state (a state displayed on the CRT 60) of the attribute information of the page default value lists 36a and 36b.

In the diagram, reference numeral 41 denotes a page default value list displayed on the CRT display 60.

Now assuming that a lateral direction is set to an X-axis direction and a vertical direction is set to a Y-axis direction, reference numerals 42a and 42b denote page sizes in the X-axis and Y-axis directions; 42c and 42d represent block positions in the X-axis direction; 42e and 42f block positions in the Y-axis direction; 42g a character offset in the Y-axis direction; 42h a character offset in the X-axis direction; 42i a line interspace of characters; and 42j a character interspace.

In the case of changing these attribute information, indicating information displayed as an image on the CRT 60 is indicated by using a pointing device 62. Thereafter, a numerical value is input by the keyboard 61, thereby changing the attribute information of the document default value list 35. To finish the changing operation, the operator depresses an end key to perform the end indication on the keyboard 61. When the CPU 27 detects the depression of the end key, the CPU 27 discriminates whether the set value is proper or not. If the set value is proper, the attribute of the document default value list 35 shown in FIG. 8A is changed on the basis of the input value and the image displayed on the CRT 60 is cleared. A new image is redisplayed on the CRT display 60 o the basis of the changed attribute information and the control is finished.

On the other hand, to change the page size set in the page default value list 36a by reference to the page size in the document default value list 35, the operator generates an indication to refer to the default by using the keyboard 61. By this indication, the page size in the document default value list 35 is set into the page size attribute information 42a and 42b in the page default value list 36a. Next, the end indication is performed.

The process to change the page size in the embodiment (i.e., the enlargement/reduction of image data) will now be described with reference to a flowchart of FIG. 10.

It is assumed that a mixed mode terminal apparatus in the embodiment has already been executing the ordinary processes.

The page size specified in the document default value list 35 in FIG. 6 is B5 and the page size specified in the page default value lists 36a and 36b is A4. At this time, an explanation will now be made hereinbelow with respect to the case where an indication to refer to the page size in the document default value lists 36a and 36b was made for the A4 size of the page 32a.

When the page size in the document default value lists 36a and 36b is set to B5, the CPU 27 first discriminates whether the block 33a made in the A4 size of the page 32a exceeds the page size (is larger than the page size) or not (step S21).

This discrimination is made by comparing the position and size of the block in the block default value list with the page size.

Figure 11A:
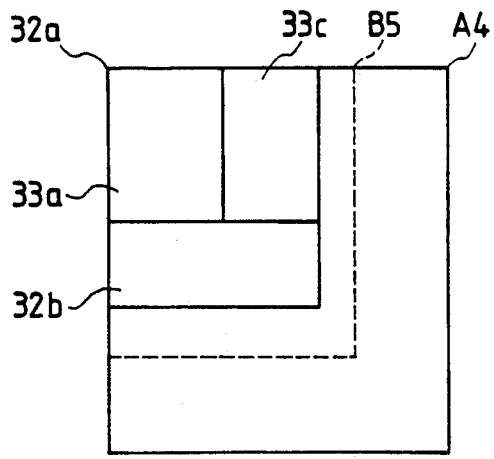
FIGS. 11A and 11B are diagrams showing the corresponding relation between the size of a block and the size of a page.

If the block 33a is within the page size, no process is executed and a similar discriminating process is executed with regard to the blocks 33b and 33c (steps S21 and S27). When all of the blocks are within the A4 size, the processing routine is finished without changing the attribute information of all blocks. This case is shown in FIG. 11A.

Figure 11B:
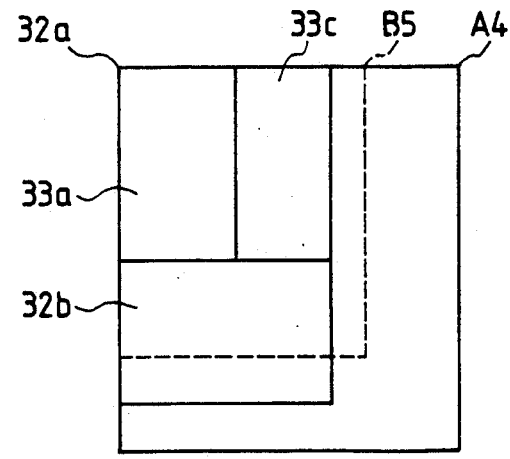

At this time, if even one of the blocks exceeds the A4 size in the page 32a, the processes in the flowchart shown in steps S22 to S26 in FIG. 10 are again executed. Namely, this case is shown in FIG. 11B.

Therefore, in the case where the page size in the document default value list 35 is B5, it is now assumed that the block 33b exceeds the size of page 32a. In this case, the CPU 27 detects that the block 33a exceeds the page size (step S21) and calculates the size rate "X" of the page size (A4 size) before change and the page size (B5 size) after change (step S22). Namely, X=(A4 size)/(B5 size). Next, a check is made to see if the block 33a is a character block or an image block (step S23). Since the block 33a is a character block in this case, the character data (character code) is converted into the image data (step S24). The image data is changed to the image of the reduced size by using the size rate "X" calculated in step S22 (step S26).

Further, since at least one block exceeds the B5 size as mentioned above, the remaining blocks other than the block 33a are searched and the reducing process is executed for all of the remaining blocks in a manner similar to the block 33a. Since the block 33b is also similarly a character block, the reducing process similar to that of the block 33a is executed. Since the attribute information is obtained by referring to the page default value lists 36a and 36b with respect to the block 33b, the block position b and block size c before change are extracted from the page default value lists 36a and 36b. By newly making the character block attribute on the basis of these data, the block position b and block size c extracted are reduced by using the size rate "X". Each of the calculated results is set to the new character block attribute. In this manner, the character block attribute at the reduced size of the block 33b is newly set.

With respect to the remaining image block 33c, a check is first made to see if the block 32b exceeds the page size or not (step S21) in a manner similar to the blocks 33a and 33b. The size rate "X" is calculated (step S22). If the block is determined to be the image block, the image data in the image block is reduced on the basis of the size rate "X" (steps S23 and S25). Further, the block position b and block size c of the image block attribute 38c are changed to the reduced size by using the size rate "X", respectively, (step S26).

Figure 10:
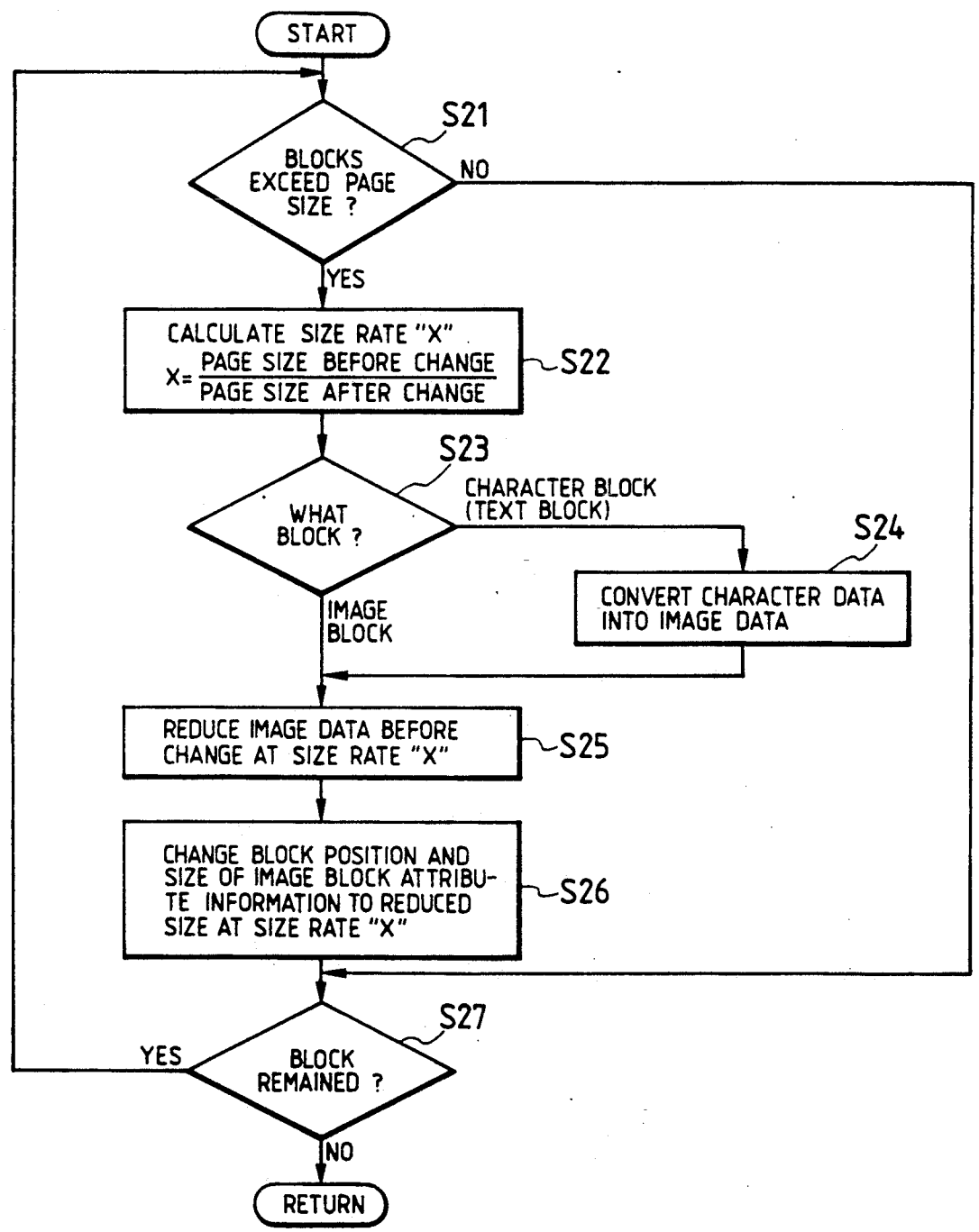
FIG. 10 is a flowchart for explaining the process to change a size of page according to the second embodiment;/

In this manner, after the reducing processes of the blocks 33a to 33c are completed and it is confirmed that no block exists in the page 32a, the processes in the flowchart of FIG. 10 are finished. The processing routine is returned to the ordinary processing steps which are executed by the mixed mode terminal apparatus. When a transmitting instruction is generated, the image data is transmitted. On the other hand, the attribution of the page default value list shown in FIG. 8A is changed on the basis of the designated input value. At this time, the image displayed on the CRT display 60 is cleared and a new image is again displayed on the basis of each of the changed attribute information. The attribute changing step is finished.

As explained above, in this embodiment, in the case of reducing the page size, if the block constituting the page exceeds the page size after the reduction, by converting the character block into the image block, the character block can be reduced by the common process as the image block.

Further, even when the page size is reduced, if the blocks constructing the page do not exceed the page size, the process to reduce the block is not executed. Therefore, the time to execute the reducing process can be omitted.

In the case of enlarging the page size, the process to enlarge the block is not executed. This is because in the case of enlarging the page size, all blocks can be output into this page. Therefore, the time to perform the enlarging process can be saved and the processing speed can be improved.

In addition to the operation described above, after the process to change the page size in step S30 was executed, when the CPU 27 further synthesizes all blocks constructing that page, this page can be handled as one image block in the subsequent processes. Thus, the subsequent processes can be performed at a high speed.

On the other hand, as a method of enlarging the page size, when the page size of B5 is specified in the document default value list 35, if the B5 size of the page 32a is changed to the page size (A4 size) in the document default value list, the page size can be enlarged by the process to enlarge each attribute data of the B5 size of the page 32a to the A4 size in a manner similar to the foregoing process.

Figure 12:
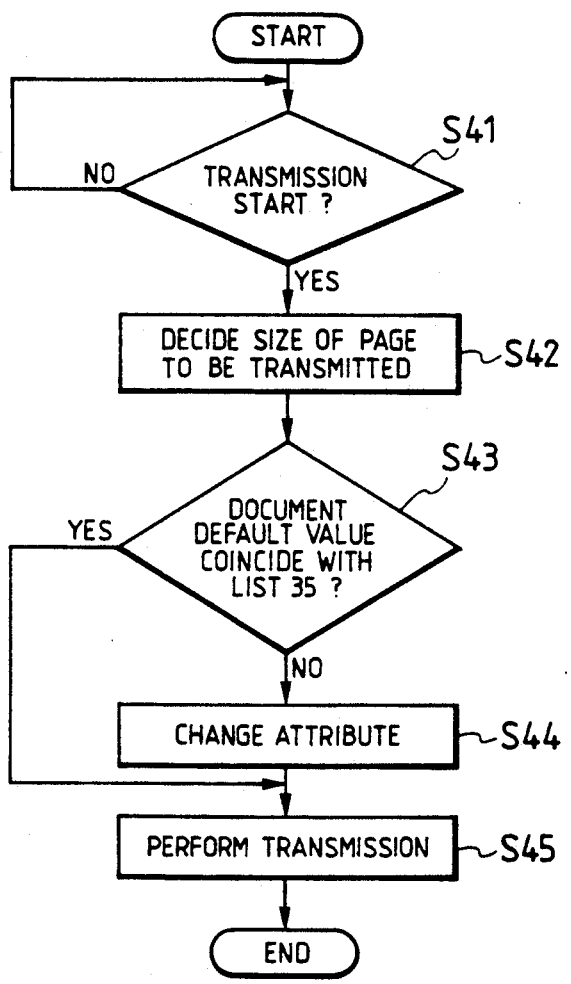
FIG. 12 is a flowchart for explaining the process to change the size of a page upon transmission.

FIG. 12 shows a flowchart of the embodiment to determine the page size in accordance with a party to be transmitted to in the case of transmitting a document.

When the CPU 27 detects that the operator indicates the transmission by the keyboard 61, the CPU 27 starts the communicating procedure (step S41). The CPU 27 determines the page size to be transmitted on the basis of the data to which the party to be transmitted to responded in accordance with the communicating procedure (step S42). The CPU 27 then discriminates whether the page size set in the document default value list 35 coincides with the transmitting page size or not (step S43). If they differ, the size information of the attribute information of the document, page, and block are changed (step S44) in a manner similar to the above. The CPU 27 subsequently transmits the document whose transmission was indicated (step S45).

As described above, according to the embodiment, it is possible to indicate to unify the page sizes during the transmitting indication instead of during the edition. On the other hand, image data can be transmitted as a document consisting of the unified page size to the party to be transmitted to.

As described above, the operation to unify the document pages during the edition can be saved and the data in one page can be easily magnified in accordance with a page size which is indicated.

The third embodiment will now be explained. In the second embodiment, in the case of variably magnifying a character block, it is font expanded into the image block and, subsequently, the variable magnifying process is executed. In the third embodiment, a character block is variably magnified by changing font.

A block diagram and a perspective view showing an arrangement of the third embodiment are similar to the block diagram and perspective view of the first embodiment shown in FIGS. 1 and 2.

In the third embodiment, a plurality of fonts of different sizes are stored in the PMEM 23.

Figure 13:
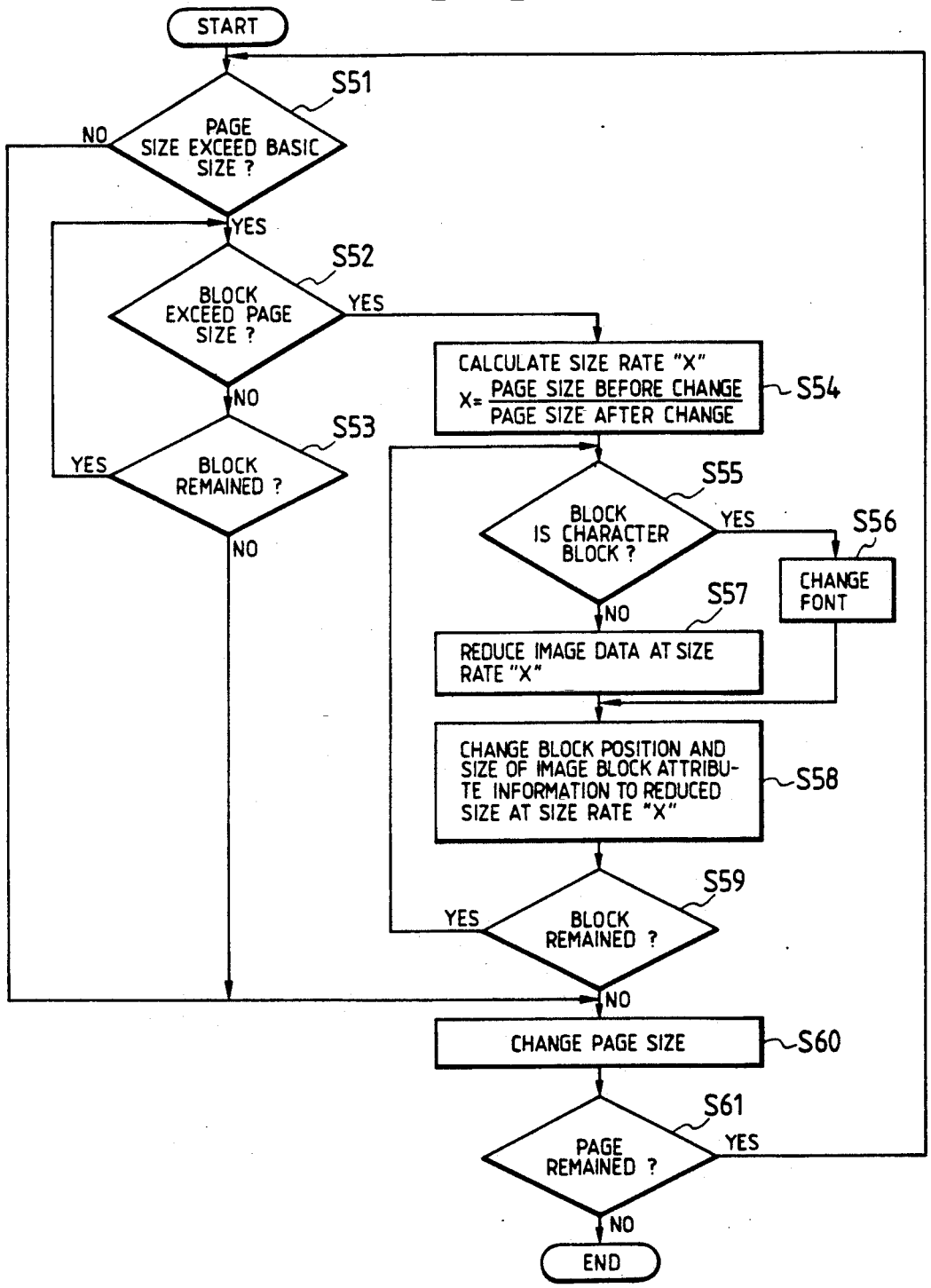
FIG. 13 is a flowchart for explaining the process to change the size of a page according to the third embodiment.

The operation of the third embodiment will now be described with reference to a flowchart of FIG. 13.

The CPU 27 compares the page size registered in the page default value list 36a with the page size registered in the document default value list 35 (step S51). When the page size in the page default value list 36a is smaller than or equal to that in the list 35, no process is executed with regard to the attribute of the block constituting the page but the page size in the page default value list 36a is changed to the page size in the document default value list 35 (step S60). On the other hand, when the CPU 27 decides that the page size in the list 36a is larger than that in the list 35, the CPU 27 checks whether each of the blocks constructing that page exceeds the page size in the document default value list 35 or not (steps S52 and S53). In this embodiment, since the size of the page 32a is larger, the CPU 27 executes the processes after step S52.

If the page 32a is constructed as shown in FIG. 11A, that is, when all of the blocks 33a to 33c are within the page size of B5 (indicated by a broken line) in the document default value list 35, no process is executed with regard to that block but the page size in the page default value list 36a is changed to the page size in the document default value list 35 (step S60).

On the other hand, if the page 32a is constructed as shown in FIG. 11B, namely, when the block 32b exceeds the B5 size although both of the blocks 33a and 33c block 32b exceeds the B5 size in step S52. In this case, the CPU 27 executes the processes in steps S54 to S59 with regard to all of the blocks 33a, 32b, and 33c constructing the page 32a.

A discrimination regarding whether the blocks exceed the page size or not is performed by obtaining the coordinates at a right lower point of each block from the position and size of the attribute information of the block and by checking whether these coordinates are within the page size or not.

The CPU 27 calculates the size rate "X" between the page size (A4 size) before change and the page size (B5 size) after change (step S54). That is, $X = (A4 \text{ size})/(B5 \text{ size})$. Next, a check is made to see if the block 33a is a character block or an image block (step S55). In this case, since the block 33a is a character block, the font stored as the attribute information of that block is changed on the basis of the size rate "X" (step S56). To change the size, a font such that the size rate with the font before change is nearest to "X" is selected. Further, the data such as character interspace, line interspace, initial offset, and the like as the attribute information are reduced on the basis of the size rate "X".

Further, the CPU 27 reduces the block position b and block size c of the attribute information of the block 33a on the basis of the size rate "X" and changes (step S58). A check is then made to see if any block remains in the page 32a or not (step S59). The processes in steps S55 to S58 are also similarly executed with regard to the block 33b. On the other hand, since the block 33c is an image block, it is reduced at the size rate "X" (step S57) and the attribute information is changed (step S58).

When the CPU 27 detects the completion of the processes of all blocks constituting the page 32a (step S59), the CPU 27 changes the page size a in the page default value list 36a of the page 32a to the page size in the document default value list 35 (step S60). Further, a check is made to see if the foregoing processes have been executed with respect to all pages which belong to the document 31 or not. If any page remains, the processing routine is returned to step S51.

With this method, the character block can be variably magnified by directly using the character code without converting the character block into the image block. Thus, this method is advantageous in terms of the processing speed and the number of memories to be used.

On the other hand, even in the third embodiment, in the case of enlarging a block or transmitting a document as described in FIG. 12, the document sizes can be unified in a manner similar to the second embodiment.

What is claimed is:

1. A mixed data processing apparatus comprising:
   memory means for storing mixed data having character blocks consisting of character codes and image blocks consisting of image data;
   discriminating means for discriminating whether or not a number of character blocks and image blocks stored in said memory means exceeds a predetermined number of blocks; and
   conversion means for converting, when the number of character blocks and image blocks exceed the predetermined number of blocks, the image blocks into one image block by combining the image blocks.

2. An apparatus according to claim 1, wherein said conversion means converts the image data stored in said memory means.

3. An apparatus according to claim 1, wherein said memory means stores data indicating whether the blocks are overlaid or not in the case where the blocks are overlapping mixed, and said conversion means combines the blocks on the basis of said overlay data.

4. An apparatus according to claim 1, wherein said conversion means converts, when the number of character blocks and image blocks exceed the predetermined number of blocks, the character codes into the image data, and combines the converted image data with the image block previously stored in said memory means.

5. An apparatus according to claim 1, further having judging means for judging whether the block stored in said memory means is the character block or the image block,
   wherein said conversion means combines the image blocks, on the basis of a judged result by said judging means.

6. An apparatus according to claim 1, further having transmitting means for transmitting the mixed data stored in said memory means to a designated party, wherein said conversion means converts the image blocks after the transmission of the mixed data is indicated.

7. An apparatus according to claim 1, further having:
   transmitting means for transmitting the mixed data stored in said memory means to a designated party; and
   recognizing means for recognizing a maximum number of transmissible blocks,
   wherein the predetermined number of blocks is the maximum number of transmissible blocks recognized by said recognizing means.

8. An apparatus according to claim 1, wherein said discriminating means discriminates the number of blocks on every page.

9. A mixed data processing apparatus comprising:
   memory means for storing mixed data having character blocks consisting of character codes and image blocks consisting of image bit data in one page, the mixed data including attribute data which represents respective positions and sizes of the character blocks and the image blocks;
   page size changing means for changing a page size of the mixed data;
   discriminating means for discriminating whether or not each block is held within the changed page size, on the basis of the attribute data; and
   magnification changing means for reducing each block in the page in a case where any one block in the page is not held within the changed page size, and not for performing magnification change with respect to the block in the page in a case where every block in the page is held within the changed page size.

10. An apparatus according to claim 9, wherein said magnification changing means variably magnifies a position and a size of said block.

11. An apparatus according to claim 9, wherein said magnification changing means variably magnifies the image bit data of said image block.

12. An apparatus according to claim 9, further having expanding means for expanding said character code into the image data, and
   wherein said magnification changing means variably magnifies the image data expanded by said expanding means.

13. An apparatus according to claim 9, wherein said magnification changing means changes a font corresponding to said character code.

14. An apparatus according to claim 9, wherein said memory means stores a document including the mixed data of a plurality of pages,
   and said page size changing means changes the size of page included in said document.

15. An apparatus according to claim 9, further having transmitting means for transmitting the mixed data stored in said memory means to a designated party,
   wherein said page size changing means changes the page size in accordance with a transmissible page size.

16. A block data transmitting apparatus comprising:
   memory means for storing a plurality of block data;
   comparing means for comparing a number of transmissible blocks with a number of blocks stored in said memory means; and conversion means for converting, when the number of blocks stored in said memory means exceeds the number of transmissible blocks, the number of blocks into one block by combining the number of blocks store din said memory means.

17. An apparatus according to claim 16, wherein said blocks include character blocks consisting of character code data and image blocks consisting of image data.

18. An apparatus according to claim 17, wherein said conversion means combines the image data.

19. An apparatus according to claim 17, wherein said conversion means converts, when the number of blocks exceeds the predetermined number of blocks, the character code into the image data, and combines the converted image data with the image block previously stored in said memory means.

20. An apparatus according to claim 17, further having discriminating means for discriminating whether the block stored in said memory means is a character block or an image block.

21. An apparatus according to claim 16, wherein said comparing means counts the number of blocks on every page.

22. An apparatus according to claim 16, wherein said memory stores data indicating whether the blocks are overlaid or not int he case where the blocks are overlappingly mixed, and said conversion means converts the blocks on the basis of said overlay data.

23. An apparatus according to claim 16, wherein said recognizing means recognizes the number of transmissible blocks on the basis of a communication procedure executed between said apparatus and a party to which the block data stored in said memory means are to be transmitted.

24. A block data processing apparatus comprising:
memory means for storing character blocks, image blocks and attribute data which together represent one page of mixed image, the attribute data including data which represents whether each block is a character block or an image block; and
magnifying means for magnifying the one page of mixed image,
wherein said magnifying means discriminates whether the block to be magnified is the character block or the image block and performs magnifying on the basis of a discriminated result.

25. An apparatus according to claim 24, wherein the character blocks consist of character codes and the image blocks consist of image pixel data.

26. An apparatus according to claim 24, wherein said magnifying means variably magnifies a position and a size of said block.

27. An apparatus according to claim 25, wherein said magnifying means variably magnifies the image pixel data of said image block.

28. An apparatus according to claim 25, further having expanding means for expanding said character code into the image data,
and wherein said magnifying means variably magnifies the image data expanded by said expanding means.

29. An apparatus according to claim 25, wherein said magnifying means changes a font corresponding to said character code.

30. An apparatus according to claim 24, wherein said memory means stores a document including the image of a plurality of pages, and said magnifying means magnifies the blocks such that the page sizes of the plurality of pages become a common size.

31. An apparatus according to claim 25, further having a transmitting means for transmitting said image, wherein said magnifying means changes the size in accordance with the processing capability of a party being transmitted to by said transmitting means.

32. A mixed data processing apparatus comprising:
memory means for storing a document consisting of a plurality of pages, each page being represented by character code data, pixel data and attribute data, the attribute data including data representing position and size of a character image represented by the character code data and data representing position and size of a pixel image represented by the pixel data;
comparison means for comparing, for each page, the attribute data with a common page size common to the plurality of pages of the document; and
process means for executing zoom processing with respect to each of the plurality of pages of a mixed image, in accordance with a comparison result of each page.

33. An apparatus according to claim 32, wherein said comparison means judges whether or not each data block of the page can be held within the page size.

34. An apparatus according to claim 32, wherein said process means performs size reduction for each data block of the page in which any one data block cannot be held within the common page size.

35. An apparatus according to claim 32, wherein said process means converts the character code into pixel data and executes the zoom processing of the converted pixel data.

36. An apparatus according to claim 32, wherein said process means further comprises judging means for judging whether said magnifying process is to be processed or not according to the comparison result for each page.

37. An apparatus according to claim 32, wherein said process means determines a zooming rate such that the character image and the pixel image are respectively held within a page size, on the basis of the attribute data and the page size.

38. A mixed data processing apparatus comprising:
memory means for storing character code data, pixel data and attribute data for representing one page of mixed image, the attribute data including data which represents position and block size of a character image represented by character code and data which represents position and block size of a pixel image represented by the pixel data;
comparison means for comparing the attribute data of the one page with a page size; and
processing means for executing image size conversion processing at a rate common to the character and pixel images of the one page of mixed image, in accordance with a comparison result of said comparison means.

39. An apparatus according to claim 38, wherein said comparison means judges whether or not each data block of the one page of mixed image can be held within the page size.

40. An apparatus according to claim 39, wherein said processing means performs, in a case where any one block of the one page of mixed image cannot be held within the page size, a size reduction for each block of the one page of mixed image.

41. An apparatus according to claim 38, wherein said processing means converts the character code into the pixel data and executes image size conversion processing on the converted pixel data.

42. An apparatus according to claim 38, wherein said process means determines a zooming rate such that the character image and the pixel image are respectively held within a page size, on the basis of the attribute data and the page size.

43. An apparatus according to claim 24, wherein the attribute data represents a position and a size of each block.

44. An apparatus according to claim 43, wherein said magnifying means judges whether or not each block is held within a designated size, and performs size reduction of each block if any one block cannot be held within the designated size.

45. An apparatus according to claim 24, wherein the attribute data represents that each block is a character block or an image block.

46. A mixed data processing apparatus comprising:
memory means for storing data which represents a mixed image consisting of plural blocks, the data including block position and size data of each block, attribute data which represents whether each block is a character image block or a pixel image block, character code which represents the character image block, and pixel data which represents the pixel image block; and
zooming means for performing zooming of both the character image block and the pixel image block of the mixed image, at a common zooming rate.

47. An apparatus according to claim 46, wherein said zooming means performs zooming of the respective pixel data of the plural pixel image blocks and the block position and size data, at a common zooming rate.

48. An apparatus according to claim 46, wherein said zooming means develops the respective character codes of the plural character image blocks into a bit image and then collectively performs zooming at a common zooming rate, and collectively performs zooming of the respective block position and size data of the plural character image blocks at a common zooming rate.

49. An apparatus according to claim 46, wherein said zooming means varies a font size of each character code of the plural character image blocks in accordance with a zooming rate, and collectively performs zooming of the respective block position and size data of the plural character image blocks at a common zooming rate.

50. An apparatus according to claim 46, wherein said zooming means determines a zooming rate such that each block is held within a page size, on the basis of the page size, the block position and size data.

51. A mixed data processing apparatus comprising:
memory means for storing data which represents a mixed image consisting of plural blocks, the data including page size data which represents a page size of the mixed image, character code which represents a character image block and pixel data which represents a pixel image block; and
varying means for varying the page size of the mixed image,
wherein said varying means varies the page size data stored in said memory means and varies image sizes of the character image block and the pixel image block.

52. An apparatus according to claim 51, wherein said varying means varies the respective image sizes in accordance with a rate of the page sizes before and after varying.

53. An apparatus according to claim 51, wherein said varying means varies the respective positions and block sizes of the character image block and the pixel image block.

54. An apparatus according to claim 51, wherein said varying means performs zooming of the pixel data.

55. An apparatus according to claim 51, wherein said varying means varies a font size of the character code.

56. An apparatus according to claim 51, wherein said varying means develops the character code into a bit image and varies an image size of the developed bit image.

* * * * *

UNITED STATES PATENT AND TRADEMARK OFFICE
CERTIFICATE OF CORRECTION

PATENT NO. : 5,113,492
DATED : May 12, 1992
INVENTOR(S) : YUMI ARIKI ET AL.

It is certified that error appears in the above-identified patent and that said Letters Patent is hereby corrected as shown below:

COLUMN 1

Line 64, "which" should read --which was--.

COLUMN 3

Line 42, "to," should be deleted and
"transmitted," should read --transmitted to,--.

COLUMN 4

Line 51, "on basis" should read --on the basis--.

COLUMN 7

Line 2, "three" should read --three.--.

COLUMN 10

Line 51, "33c block" should read --33c are within the
B5 size, the CPU 27 detects that the block--.

UNITED STATES PATENT AND TRADEMARK OFFICE
CERTIFICATE OF CORRECTION

PATENT NO. : 5,113,492
DATED : May 12, 1992
INVENTOR(S) : YUMI ARIKI ET AL.

It is certified that error appears in the above-identified patent and that said Letters Patent is hereby corrected as shown below:

<u>COLUMN 13</u>

Line 5, "store din" should read --stored in--.
    Line 26, "int he" should read --in the--.

Signed and Sealed this

Twenty-fourth Day of August, 1993

Attest:

BRUCE LEHMAN

Attesting Officer     Commissioner of Patents and Trademarks